Figure 1:
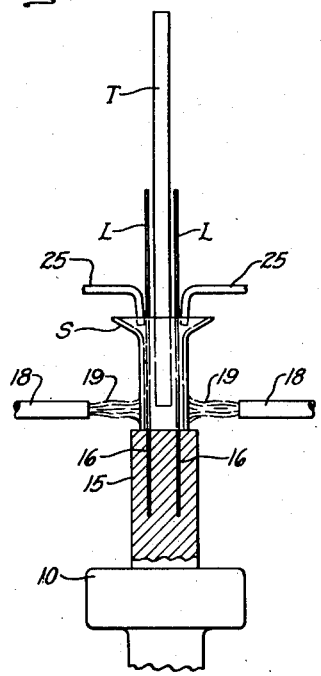

July 18, 1950  A. GREINER ET AL  2,515,706
METHOD OF SEALING METAL TO GLASS
Filed Oct. 16, 1943

Inventors:
Elliot Q. Adams,
Alfred Greiner,
by John H. Anderson
Their Attorney.

Patented July 18, 1950

2,515,706

UNITED STATES PATENT OFFICE 2,515,706

METHOD OF SEALING METAL TO GLASS

Alfred Greiner and Elliot Q. Adams, Cleveland Heights, Ohio, assignors to General Electric Company, a corporation of New York Application October 16, 1943, Serial No. 506,530

2 Claims. (Cl. 49—81)

This invention relates to a method of making inlead seals for thermoplastic bulbs or envelopes, including electrical devices such as incandescent lamps and various kinds of discharge devices. It is especially concerned with gas or vacuum-tight seals involving the penetration of vitreous envelope walls by lead lengths of refractory metals like tungsten or molydenum, or alloys of these metals. Where reference is made hereafter to "tungsten metal" it will be understood to apply equally to the other refractory metals. The leads or current supply conductors of such a device need not be of tungsten metal throughout their entire length, but may comprise short "seal sections" of tungsten metal that are embedded in the vitreous envelope material, and are welded at their ends to lengths or sections of other metal, that form the internal and external leads of the device. For example, seal sections of tungsten metal wire may be interposed between internal and external lead wires of nickel and copper, respectively, of which the latter may advantageously be multistranded. Besides fused quartz or quartz glass, other hard glasses which seal well to tungsten metal are available commercially, including various high heat resistant borosilicate glasses that are marketed under designations such as "Nonex" or "702P," "704EO," "705AJ," etc.

Glass envelopes with tungsten metal lead lengths in their inlead seals are used especially for lamps or vacuum tubes which are subject to relatively high operating temperatures, for example, movie projector lamps that are marketed under the designation "750 Projector, 300 Watt." Such lamps commonly involve an ordinary "stem flare" type of mount and inlead seal construction, with hard borosilicate glass as the material of at least their stem flares; and we have hereinafter explained our invention with particular reference to this type of construction.

In making such gas and vacuum-tight tungsten metal seals according to present practice, the tungsten metal wire may first be cleaned with fused sodium or potassium nitrite. The clean tungsten metal is superficially and very lightly oxidized in an oxidizing gas flame, and is then "wrapped" or "sleeved" with glass, by slipping a thin borosilicate glass sleeve around it and fusing and sealing this sleeve to the wire in a very hot gas flame, so as to protectively coat with glass the tungstein metal seal section and the welded joints that unite it to the adjacent wire lengths. The thin film of oxide on the tungsten metal bonds the glass coating thereto, and a small amount of oxide seems to be taken up into the glass, giving it a brown to golden bright bronze appearance when cold. The oxidation of the wire to afford this bond to the glass is important to produce a tight seal; but it is also important that the wire be not too heavily oxidized, which would result in a leaky seal, recognizable by a very dark or even black appearance of the glass-coated or sleeved wire. For tungsten, the most favorable color is decidedly brighter than for molybdenum—a bright bronze as against a chocolate brown, usually.

The protectively precoated or "sleeved" lead wires are then inserted through the stem flare on the usual stem-making machine, and the end of the flare is externally heated and softened or "fused" with gas flames, and is collapsed or flattened around the wire. During this operation, the leadwires are heated from the surrounding glass of the stem, but are protected from oxidation by their precoatings of glass. To form the seal more perfectly, the fused end of the flare may be squeezed or pinched shut between movable clamps, thus making the seal a "press," as it is termed. Usually a small exhaust tube arranged to extend into the stem flare is included in the seal, and is closed at its inner end when the seal is completed; but by subsequently blowing air through this tube, the tube end is reopened, either endwise or laterally through the seal.

The wrapping or sleeving of the tungsten metal wire as just described is an extra hand operation that requires experience, judgment, and skill on the part of the operators, and is thus a very substantial item of cost in seal making. Considerable expense is also involved in the inspection of the wrapped leads to reject defective wrappings, as well as in the shrinkage in production represented by such defective wrappings, and by defective stem seals and lamps that result from failures in inspection. "Borating" the tungsten metal wire (i. e., protectively precoating it with boric oxide as described in the application of Shannon Jones, Serial No. 424,359, filed December 24, 1941, now abandoned), has been proposed as an alternative for wrapping, but is still an extra operation.

In accordance with our invention, the drawbacks above referred to may be overcome by doing away with lead-wire wrapping or borating, or the like; and even the preliminary oxidation of the tungsten metal as a separate operation may also be dispensed with in some cases. Thus stem-making with tungsten metal lead-seals in hard borosilicate glass becomes essentially as simple as that with "Dumet" lead-seals in ordinary soft glass, though higher temperatures of heating are naturally required to soften or fuse the borosilicate glass. Various other features and advantages of the invention will appear from the following description of a mode of carrying it out, and from the drawings.

Figure 2:
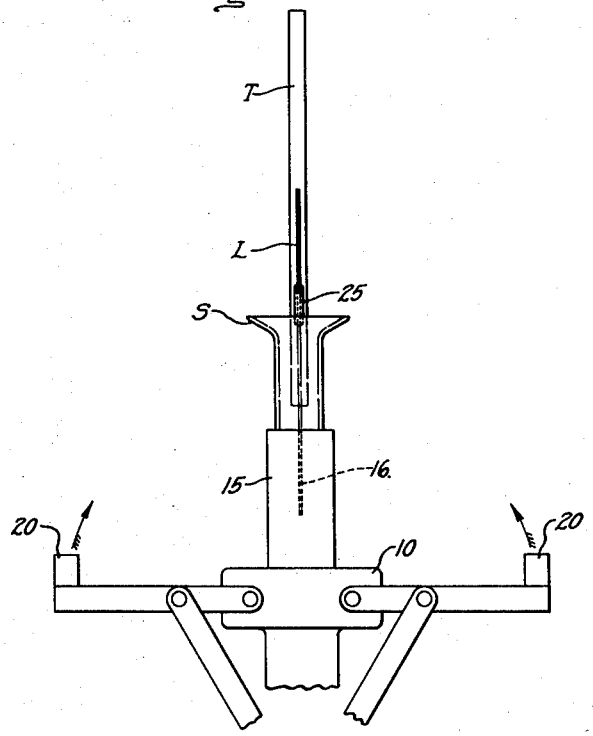
Figure 3:
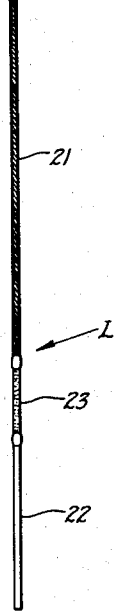
Figure 4:
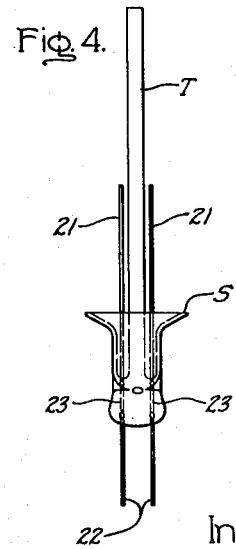

In the drawings, Figs. 1 and 2 are somewhat diagrammatic elevations illustrating the manufacture of tungsten metal stem-flare seals according to the invention; Fig. 3 is a side view of a current lead with a sealing section of tungsten metal suitable for the practice of the invention; and Fig. 4 is a side view of an inlead seal through a stem flare as produced according to the invention.

In Figs. 1 and 2, there is represented somewhat diagrammatically a rotary head 10 of an ordinary type of stem-making machine. A block-like support 15 is shown on the head 10 with the open lower end of the stem S resting on it and substantially closed or occluded by it. For the lamp leads L, L, guide or socket holes 16, 16 are formed in the block 15. Stationary burners 18, 18 are shown, which direct external (oxidizing) heating flames 19, 19 on the lower end of the stem tube S as it revolves coaxially with the head 10. Movable pressing jaws 20 for pinching flat the lower fused end of the tube S to form a pressed seal embedding the leads L, L are shown in Fig. 2. As shown in Fig. 3, each of the leads L comprises an external multi-stranded lead-wire length 21 (as of copper) and an internal single-strand lead-wire length 22 (as of nickel), with an intermediate single-strand length 23 of tungsten or molybdenum, or an alloy including either or both of these. In Fig. 3, superficial oxidation of the sealing section 23 is indicated by light stippling. The sealing sections 23, 23 of the leads L, L are arranged in the lower end of the stem tube S where the seal is to be formed. Fig. 4 shows a pressed stem-flare seal produced according to the invention, as illustrated in Figs. 1 and 2.

For the purposes of this invention, means are provided for supplying gas of mildly oxidizing character, such as carbon dioxide ($CO_2$), to the interior of the stem tube S around the leads L, L extending therethrough. In general, it is better not to employ the exhaust tube T for this purpose, but to provide other special conduit means. In Figs. 1 and 2, there are shown two metal gas supply tubes 25, 25 with their open lower ends projecting downward into the flared upper end of the stem tube S. These tubes 25, 25 may be so placed that the tube S can be slipped under their lower ends and then raised slightly to allow of placing the lower end of tube S itself on the block 15 as shown. Being heavier than air, the carbon dioxide supplied through the tubes 25, 25 naturally remains in the stem tube S, so that the consumption of the gas is very moderate— merely somewhat more than enough to make up for leakage at the lower end of the tube S.

The apparatus here illustrated and described resembles that shown in U. S. Patent 2,006,568, granted July 2, 1935, to Gustin and Flook, for supplying reducing gas to the interior of a stem tube through which are sealed current leads of ordinary metal like copper-surfaced "dumet" wire. In accordance with our invention, however, the gas used is not reducing, but of mildly oxidizing character. Because of this mildly oxidizing character of the gas that surrounds the leads L, L while they are heating from the surrounding heated tube S, adequate superficial oxidation of the tungsten metal at 23, 23 is assured, even if it should be imperfectly oxidized beforehand, or if some of the oxide should have cracked off or been rubbed off; while excessive oxidation that might result in leaky seals is avoided or prevented. Also, reduction of any easily reducible component of the glass of the tube S at its internal surface is obviated—such, for example, as the lead oxide in "Nonex" or "702P" borosilicate glass. By correlating the oxidizing power of the gas supplied at 25, 25 with the length of time that the tungsten metal is exposed to it at oxidizing temperature in the making of a stem seal, it is possible to dispense altogether with any preliminary oxidation of the tungsten metal before the leads L, L are put in place inside the tube S. For this purpose, gas more or less powerfully oxidizing than pure carbon dioxide may be used—for example, carbon dioxide enriched with an admixture of oxidizing gas like air or oxygen, or diluted with an admixture of nitrogen, or of other inert or reducing gas.

When the superficially oxidized tungsten metal 23 is thus embedded and fusion-sealed directly in the high-heat-resistant hard glass forming the collapsed end of the envelope stem portion S, without the intervention of any preapplied protective coating (whether glass wrapping or boric oxide) on the tungsten metal, it presents a characteristic gold-bronze appearance very similar to that of a wrapped tungsten lead length as it is seen through the glass in which it is embedded. The seals can be produced with a good average of gas and vacuum-tightness, and it is possible to avoid almost entirely the over-dark appearance of the tungsten metal that is characteristic of leakers due to over-oxidation.

What we claim as new and desire to secure by Letters Patent of the United States is:

1. The step in the process of sealing wire of readily oxidizable refractory metal of the group consisting of tungsten and molybdenum and alloys thereof directly in a portion of a hard glass tube containing an easily reducible component and having an internal diameter many times larger than the diameter of the wire which comprises flowing carbon dioxide gas over the surfaces of the wire and the glass tube while fusing them together.

2. The step in the process of sealing wire of readily oxidizable refractory metal of the group consisting of tungsten and molybdenum and alloys thereof directly in a portion of a hard glass tube containing lead oxide and having an internal diameter many times larger than the diameter of the wire which comprises flowing carbon dioxide gas over the surfaces of the wire and the glass tube while fusing them together.

ALFRED GREINER.
ELLIOT Q. ADAMS.

REFERENCES CITED

The following references are of record in the file of this patent:

UNITED STATES PATENTS

| Number | Name | Date |
|---|---|---|
| 282,884 | Guest | Aug. 7, 1883 |
| 850,029 | Meeker | Apr. 9, 1907 |
| 866,301 | Potter | Sept. 17, 1907 |
| 1,054,647 | Kent et al. | Feb. 25, 1913 |
| 1,154,081 | Weintraub | Sept. 21, 1915 |
| 1,266,614 | Newcomb | May 21, 1918 |
| 1,427,870 | Van Keuren | Sept. 5, 1920 |
| 2,006,568 | Gustin et al. | July 2, 1935 |
| 2,123,015 | Marden et al. | July 5, 1938 |
| 2,192,892 | Brandt | Mar. 12, 1940 |
| 2,274,999 | Allen | Mar. 3, 1942 |

FOREIGN PATENTS

| Number | Country | Date |
|---|---|---|
| 7,508 | Great Britain | 1899 |
| 104,746 | Australia | Aug. 18, 1938 |
| 549,277 | Great Britain | Nov. 13, 1942 |